INVENTORS
KENNETH W. VAN DUZER, JR.
RICHARD F. MAXWELL, JR.

BY Claude Funkhouser
ATTORNEY

United States Patent Office 3,278,932
Patented Oct. 11, 1966

3,278,932
INFRARED SYSTEM AUDIO AUGMENTATION CIRCUIT
Kenneth W. Van Duzer, Jr., Severna Park, and Richard F. Maxwell, Jr., Baltimore, Md., assignors, by mesne assignments, to the United States of America as represented by the Secretary of the Navy
Filed Sept. 30, 1963, Ser. No. 312,811
1 Claim. (Cl. 340—384)

This invention relates to infrared detection systems and more particularly to a circuit capable of augmenting the traditional infrared visual output display.

Infrared radiation is transmitted by all solid bodies. It is electromagnetic in form and is not visible to the unaided human eye. The intensity of infrared radiation is dependent upon several variables, particularly heat.

If a device capable of detecting variations in infrared radiation intensity is scanned across a given area, an intensity modulated output is obtained proportional to the temperatures of the various objects scanned.

Since it is heat dependent, infrared radiation has been made the basis of many different and varied detection systems. One common type is the heat homing mechanism in many modern air to air rockets.

Infrared radiation detectors are also used extensively by human monitors to sense the presence of a temperature variance caused by the proximity of a hot body. An example of this is a detector which will disclose the presence of a missile exhaust. In such a system, the surrounding area is scanned and a human operator visually distinguishes the target signal from the background clutter.

The invention is intended to augment the above mentioned visual display with an audible tone whenever a target pulse is received by the infrared scanner. In the embodiment herein described, the target's pulse will cause a pleasant ringing sound on the head phones of the operator.

It is, therefore, an object of the present invention to provide a device which will aid in the detection of certain objects.

It is another object of the present invention to provide a device which will aid in the infrared detection of certain objects.

It is a further object of the present device to provide an invention which will augment present infrared detection output devices.

Other objects, advantages and novel features of the invention will become apparent from the following detailed description of the invention when considered in conjunction with the accompanying drawings wherein.

Figure 1:
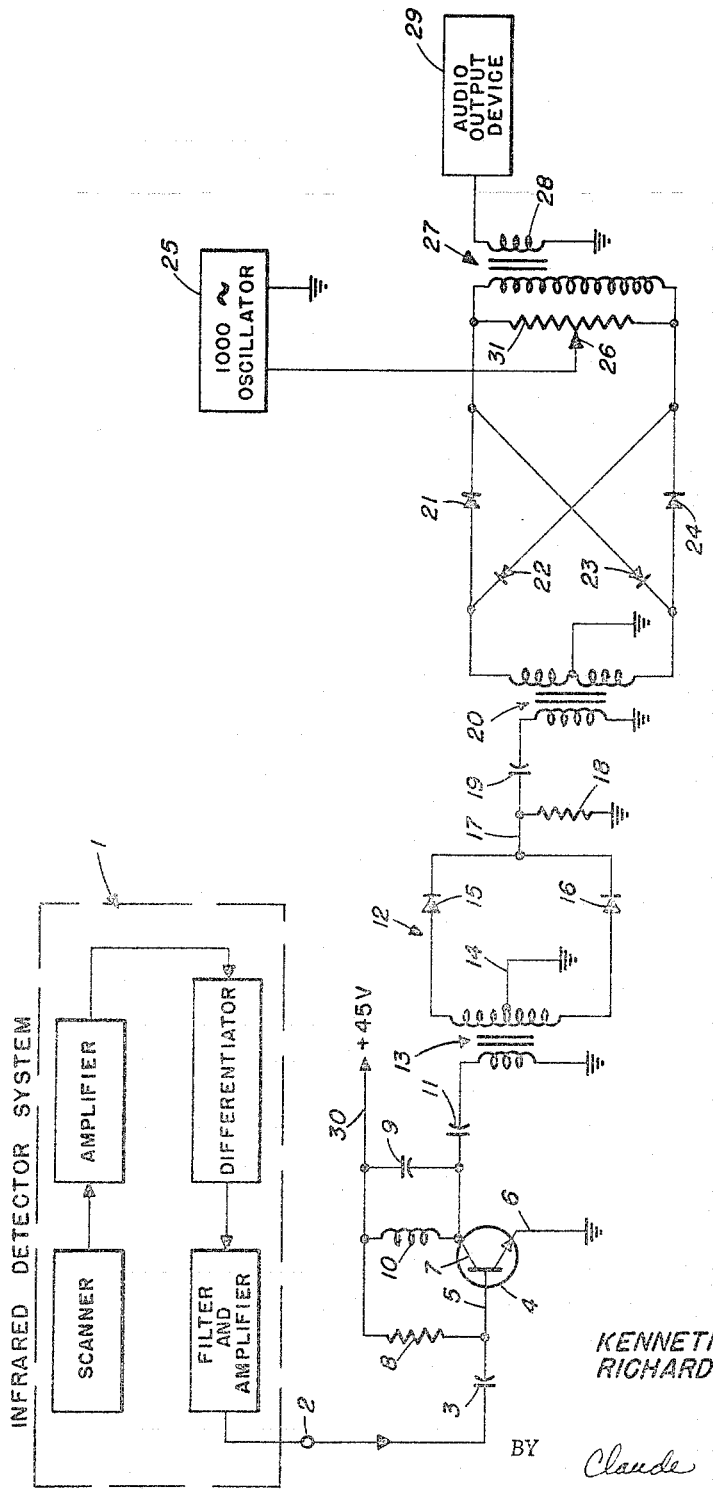
FIG. 1 is a schematic diagram of the invention.

Referring to FIG. 1, the invention is shown in combination with a part of an infrared detector system located within the dashed lines. Such a system is part of standard infrared scanners and does not comprise a part of the present invention.

From the detector at an intermediate point, a voltage is obtained which contains predictable fundamental frequency of a target pulse, some 300 cycles per second. This target signal is fed via a coupling capacitor 3 to a high Q resonant circuit. This circuit consists of a transistor 4 having a base lead 5, an emitter lead 6 and a collector lead 7. The emitter lead of the transistor 4 is connected to ground. Between the base and collector leads of the transistor, a resistor 8 is connected in series with a parallel combination of a capacitor 9 and an inductor 10. The junction of the resistor 8 and the resonant elements 9 and 10 is coupled to a +45 volt source by lead source 30. Also connected to the collector lead 7 is a coupling capacitor 11, the purpose of the coupling capacitor being to connect the high Q resonant circuit output to a full wave rectifier 12, the latter having as its input a transformer 13, which has a secondary coil grounded at its midpoint 14. The rectifying elements are shown as semi-conductors 15 and 16 having a common output point 17, the output point 17 being afforded a D.C. path to ground via resistor 18.

Also connected to the rectifier common output point 17 is a coupling capacitor 19, the capacitor connecting the rectifier output to the primary of a modulator input transformer 20.

The modulator is shown as a diode ring design and it consists of four diodes, 21, 22, 23 and 24 connected in the familiar ring configuration. The signal to be modulated is obtained from a local oscillator 25 which has an output at 1,000 cycles.

The output of the local oscillator 25 is placed on a variable tap 26 of a rheostat or potentiometer 31 placed across the primary of modulator output transformer 27.

The secondary 28 of the modulator output transformer 27 is connected to an audio output device 29 which is listened to by the detector operator. Therefore, the audio output device may be any prior art component which would function to render the modulator output audible. This could be, for example, a set of head phones.

It should be understood at this point that while the circuit described above does represent the preferred design, numerous changes could be made without departing from the scope of the invention. For example, there are many wave detectors known to the prior art which could be substituted for the particular detector described above without departing from the scope of the invention.

To aid in the complete understanding of the circuit described above, the following component values are listed.

Resistors:
| 8 | 1 megohm. |
|---|---|
| 18 | 10 kiloohm. |
| 26 | 5 kiloohm. |

Capacitors:
| 3 | .1 microfarad. |
|---|---|
| 9 | .47 microfarad. |
| 11 | .22 microfarad. |
| 19 | .15 microfarad. |

Inductor 10 _____ 430 millihenries.

Transformer turns ratios:
| 13 | 1:2 |
|---|---|
| 20 | 10:2 |
| 27 | 10:1 |

Diodes (all) _____ 1N34
Transistor _____ 2N334

Figure 2:
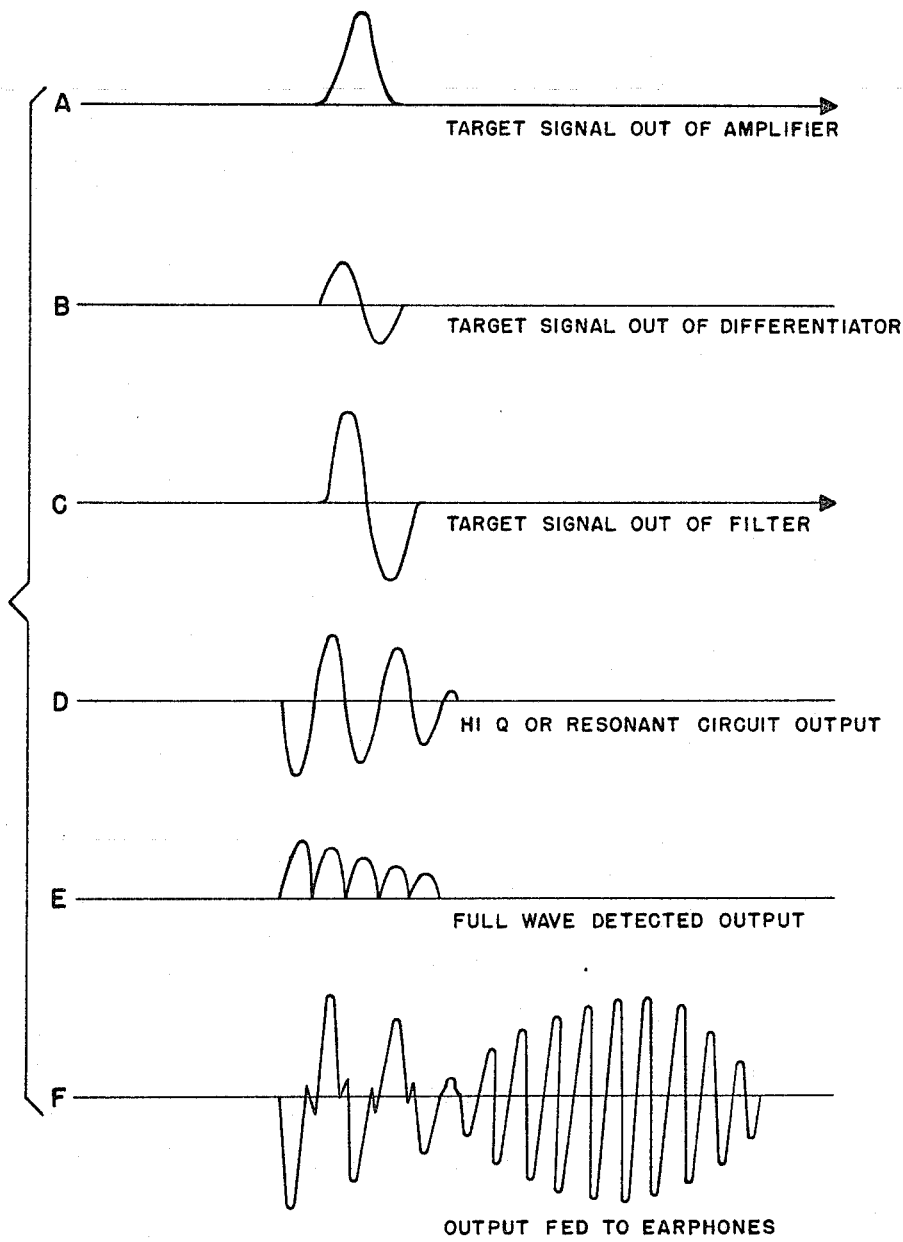
FIG. 2 shows several wave forms that are important in the understanding of the invention.

The wave forms important to the circuit are seen in FIG. 2, the test points being shown on FIG. 1. Referring now to FIG. 2 of the drawings, there is shown at A, B and C waves as encountered within the infrared detector system and are included in this disclosure to insure complete understanding of the entire combination. The pulse wave shown at FIG. 2–A is the signal generated by the infrared scanner. It is amplified and then differentiated, which generates the waves form shown at FIG. 2–B. This differentiated target signal is in turn filtered which yields the wave form shown at FIG. 2–C. The latter wave form is the input signal to the circuit of the invention.

If the input to the circuit of FIG. 1 (as shown at FIG. 2–A) is of the proper frequency, denoting, thereby, the detection of a target, then the high Q resonant circuit 9, 10 is caused to oscillate slightly and yield a damped wave as shown at FIG. 2–D.

The damped wave is connected via coupling capacitor 11 to a full wave detector 12, which has an output as shown at FIG. 2-E.

It is noted at this point that the electrical size of the coupling capacitor 19 which feeds the modulator circuit is important in that it determines the tonal characteristics of the audible target signal. The signal shown in FIG. 2-E has two predominant frequency components. The first consists of a high frequency burst and the second a D.C. or low frequency pulse. The high frequency component when mixed with the 1000-cycle output of oscillator 25 produces the first few high amplitude pulses shown in FIG. 2-F. The low frequency or D.C. pulse produces the after ring of pulses also shown in FIG. 2-F. The duration and amplitude of the after ring is due to the D.C. transient or low frequency components of the keying signal. The frequency of the after ring pulses is 1,000 cycles per second.

When a target is scanned, then, a pleasing ringing effect is noted, while background and noise signals produce a garbled sound. It should be noted, therefore, that if the output of the high Q circuit 9, 10 were not detected, a target would be indistinguishable from background and noise signals. The frequency of the after ring shown in FIG. 2-F has been so chosen that the ring gives a ping-like quality to target signals rather than just a click as would be the case without the after ring.

Obviously many modifications and variations of the present invention are possible in the light of the above teachings. It is therefore to be understood that within the scope of the appended claim the invention may be practiced other than as specifically described.

What is claimed is:

In a detection system the combination comprising
an input for receiving signals indicative of the presence of a target;
a coil and a capacitor forming a high-Q circuit connected to the input;
an electron device connected across the coil and capacitor high-Q circuit;
a full wave rectifier;
first connecting means joining the electron device and the rectifier;
an input transformer having a center-tapped secondary winding;
oppositely poled unidirectional devices connected at both ends of the secondary winding;
an output transformer;
a potentiometer connected across the primary winding of the output transformer;
a source of signals to be modulated, the signal source being connected to the sliding arm of the potentiometer;
second connecting means joining the rectifier means and the input transformer; and
means connected to the output of said output transformer for rendering said output audible.

References Cited by the Examiner
UNITED STATES PATENTS

| | | | |
|---|---|---|---|
| 2,442,805 | 6/1948 | Gilson | 340—384 |
| 2,967,940 | 1/1961 | Erb et al. | 250—83.3 |
| 3,044,054 | 7/1962 | Sneath | 340—156 X |

FOREIGN PATENTS 1,015,056   9/1957   Germany.

OTHER REFERENCES

Millman, J.: Vacuum Tube and Semiconductor Electronics, McGraw-Hill, New York, 1958, pages 344 and 410.

Millman, J., and Taub, H.: Pulse and Digital Circuits, McGraw-Hill, New York, 1956, page 505.

RALPH G. NILSON, *Primary Examiner.*

S. ELBAUM, *Assistant Examiner.*